United States Patent

[11] 3,545,737

[72] Inventors Richard V. Lamprey
169 1/2 E. State St., Athens, Ohio 45701;
Karl J. Otto, 405 William St., Somerville, New Jersey 08876
[21] Appl. No. 724,895
[22] Filed April 29, 1968
[45] Patented Dec. 8, 1970

[54] TORSIONAL ENERGY ABSORPTION DEVICE
9 Claims, 4 Drawing Figs.
[52] U.S. Cl. .................................................. 267/141, 267/57.1
[51] Int. Cl. .................................................. F16f 1/14
[50] Field of Search ........................................ 267/154, 57.1

[56] References Cited
UNITED STATES PATENTS
2,824,734  2/1958  Linn et al. ..................... 267/57.1
3,436,069  4/1969  Henschen ...................... 267/152

Primary Examiner—James B. Marbert
Attorney—Raymond P. Niro

ABSTRACT: A torsional energy absorption device which may be used in the suspension system of various vehicles and industrial equipment is provided by filling the entire space between a hollow outer member and an inner shaft member with an elastomeric material such as polyurethane.

PATENTED DEC 8 1970

3,545,737

INVENTORS
RICHARD V. LAMPREY,
KARL J. OTTO,

TORSIONAL ENERGY ABSORPTION DEVICE

BACKGROUND OF THE INVENTION

1. Field of the Invention

This invention relates to a torsional energy absorption device which employs an elastomeric material to absorb torsional forces between a hollow outer member and an inner shaft member of either solid or hollow cross section. The energy absorption device of this invention is constructed to absorb an unusually high shock torque loads or a range of shock torque loads when either the outer hollow member or inner shaft member is held stationary while the nonstationary member acts as the action system and the elastomeric material disposed between the inner and outer members acts as the flexing and absorption medium. The general mechanical problem to which the present invention may be directed is conveniently explained by reference to the suspension system of an automobile. Springs and shock absorbers are normally used to provide for vertical motion of the wheels and to dampen the effect of sudden forces. The device of the present invention not only provides a less expensive means for accomplishing this purpose, but is also more compact, less subject to breakdown, mechanically safer and smoother in operation.

2. Description of the Prior Art

Elastic joints in which rubber roller type cushions are disposed between a hollow outer member and an inner shaft member are known in the prior art.

The rubber cushioning elements, typically in the form of cylindrical rods which extend along the combined length of the inner and outer members, provide both a torque absorbing medium and offer resistance to the relative rotation of the inner and outer members. The operability of such coupling devices is greatly limited, however, because of their design characteristics. First, the large amount of slippage which occurs between the inner shaft member and the rollers, together with the relatively small bearing surface exposed for compression, limits the amount of torsional force that can be applied to or absorbed by the device. In addition, such rollers are subjected only to compressive stresses rather than compressive and tensional stresses. Second, the amount of torsional force absorbed by the rubber material is sharply reduced since the entire void between the inner and outer members is not filled with an energy absorbing medium. Furthermore, the rollers do not have complete circumferential support and are, therefore, more likely to crack and breakdown after long use. Third, the mass production capability of such devices is greatly limited since the rubber rollers must be preshaped and precompressed prior to installation. Finally, the rubber rollers of the prior art devices will not prevent the inner and outer members from touching and interfering with rotation when the inner and outer members are subjected to normal nonaxial forces.

The present invention eliminates all of the conventional problems which exist in the prior art devices by filling the entire void between the inner and outer members with a elastomeric material. The torsional energy absorption device disclosed herein provides a continuous body of elastomeric material between the inner shaft member and the hollow outer member, thus providing positive alignment of the members under all stresses, an increased load capacity, a longer life by using elastomeric material, ease of fabrication and the exclusion of foreign matter from the surfaces of the inner and outer members.

SUMMARY OF THE INVENTION

Since previous torsional energy absorption devices, which contain rubber cushioning elements disposed between two rotatable members, are expensive, subject to high maintenance costs, and incapable of absorbing extremely high tension and compression forces, it is the object of this invention to provide a low cost torsional energy absorption device having a continuous body of elastomeric material between an inner shaft member and a hollow outer member to insure positive alignment of the members under all stresses, absorb a side range of tension and compression loads, provide a large bearing surface for compression and eliminate high maintenance and manufacturing costs prevalent in the prior art devices. In the torsional energy absorption device of the present invention, the space between the hollow outer member and the inner shaft member is filled with an elastomeric material which is normally in nonslip engagement with the interior of the outer member and exterior of inner member. The inner and outer members can be made in various forms or configurations from structural steel, aluminum, plastic or like materials. Elastomeric materials useful in this invention include synthetic polyisoprene, polychloroprene, poly(styrene-butadiene), poly(acrylonitrile-butadiene), polyisobutylene, polybutadiene, polysulfide, chlorosulfonated polyethylene, polysiloxane, polyurethane diisocyanate, polyacrylate, and ethylene-propylene copolymers. Preferably a polyurethane composition made from a prepolymer of diphenylmethane diisocyanate is used because of the wide range of tensile modulus (650 p.s.i. to 2,400 p.s.i. at 100 percent elongation) and compressive strength (300 p.s.i. to 1,325 p.s.i. at 10 percent deflection) which such polymers exhibit.

In the practice of this invention, the inner shaft member can be held stationary while the hollow outer member provides an action system (e.g. yields to torsional force) and the elastomer acts as the flexing and absorbing medium. On the other hand, the hollow outer member can be held stationary while the inner shaft member acts as the action system and the elastomer acts as the flexing and absorbing medium. In addition, both the outer and inner members can be used as the action system with the elastomer again acting as the flexing and absorbing medium.

Typically, the elastomeric material is poured into the void between the inner and outer members and allowed to cure. On curing the elastomeric material becomes a resilient solid mass, adhered to the inner and outer members.

The torsional energy absorption device may be used in an automobile or trailer suspension system thereby eliminating costly and troublesome springs and shock absorbers. It may also be used as a suspension means for a tractor or industrial seat, a vibration dampening engine mount, an absorption device for automotive bumpers, or as a means of providing inexpensive and low maintenance type suspension systems in other applications. Such energy absorption devices will provide both vibration dampening and torsional energy absorption with fewer moving parts, while at the same time providing a substantial savings in weight and cost.

BRIEF DESCRIPTIONS OF THE DRAWINGS

The invention will be better understood by reference to the accompanying drawings in which.

DESCRIPTION OF THE PREFERRED EMBODIMENTS

Figure 2:
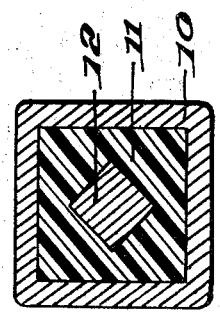
FIG. 2 is a cross-sectional view of another suggested configuration of the torsional energy absorption device.
Figure 1:
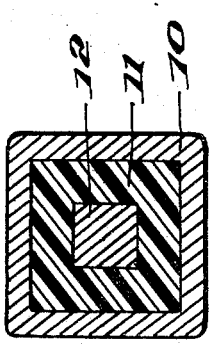
FIG. 1 is a cross-sectional view of a suggested configuration of the torsional energy absorption device of the invention.

As diagrammatically indicated in FIGS. 1 and 2, the elastomeric material 11 is disposed between the inner shaft member 12 and the hollow outer member 10 so as to completely fill the space therebetween. The elastomeric material 11 may be poured into the space between the inner shaft member 12 and the hollow outer member 10 so that it adheres to them on solidification. In the above described embodiment, the elastomeric material adheres to the inner and outer members, while the torsional energy absorption characteristics and the vibration dampening characteristics are dependent upon the tensile and compressive properties of the elastomeric material and upon the configuration of the inner and outer members.

In addition, the elastomeric material 11 may be precast and the torsional energy absorption device assembled from the component parts. In this case the elastomeric material will not adhere to the inner shaft member 12 or to the hollow outer member 10. When the elastomeric material does not adhere to the other members, movement between the inner and outer members and the surface of the elastomeric material may accompany the application of torque to the device. This surface movement is within the scope of this invention and may be controlled by proper choice of cross-sectional configurations of elements 10, 11 and 12 in FIGS. 1 and 2. The torsional energy absorption and damping characteristics are dependent upon the physical properties of the elastomeric material and on the cross-sectional configurations of all elements (namely 10, 11 and 12) being noncircular. Generally maximum absorptional energy characteristics are provided when the elastomeric material is adhering to the inner and outer members.

Furthermore, conventional brackets or clamps may be substituted for the hollow outer member, or the elastomeric material may be bonded to a stationary frame thereby eliminating the need for a separate hollow outer member. Since the elastomeric material may be precast, and since the primary function of the hollow outer member is to serve as a means for rigidly affixing the outer surface of the elastomeric material to a frame or other member, it is not necessary that the elastomeric material be separately encapsulated. Preferably the elastomeric material is externally bounded on at least four sides by conventional brackets, clamps or by the hollow outer member. The hollow outer member, however, provides maximum support for the elastomeric material.

As seen by FIGS. 1 and 2, the neutral position of the inner shaft member 12 with respect to the hollow outer member 10 may be chosen to give the proper characteristics of operation.

Various configurations, not shown, of the inner shaft member and hollow outer member cross sections may be chosen to give desired operating characteristics and ease of fabrication. For example, an inner shaft member with a rectangular, rather than a square, cross-sectional configuration would result in a higher ratio of compressive stress to shear stress at the inner shaft member-elastomeric material boundary.

Figure 3:
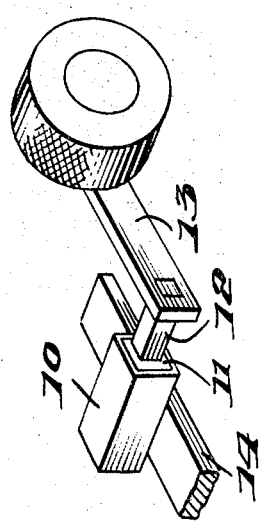
FIG. 3 is a perspective view of the energy absorption device incorporated in a suspension system in which the inner shaft member of the absorbing device is the active member, the hollow outer member is fixed and the elastomeric material provides a flexing and absorbing medium.
Figure 4:
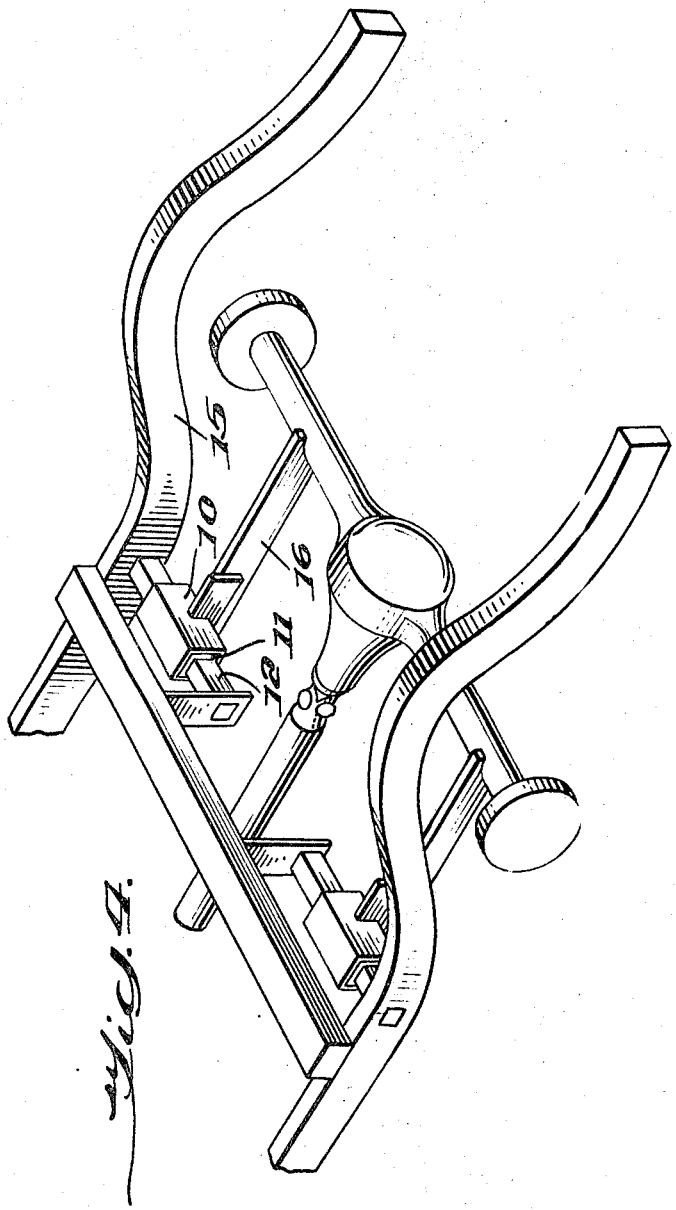
FIG. 4 is a perspective view of the energy absorbing device incorporated in a suspension system in which the hollow outer member of the absorbing device is the active member, the inner shaft member is fixed and the elastic material between the inner and outer members provides a flexing and absorbing medium.

As shown in FIG. 3, the hollow outer member 10 may be affixed to a frame 14 and the inner shaft member 12 rigidly connected to a lever arm 13. Another arrangement, in which the inner shaft member 12 is affixed to a frame 15 and a lever arm 16 is rigidly connected to the hollow outer member 10, is shown in FIG. 4. A third arrangement of the device of this invention, in which independently acting lever arms are rigidly connected to both the inner and outer members, makes both the inner and outer members act as an action system with the elastomeric material acting as a flexing and absorbing medium.

It may be desired for purposes of application, fabrication or reinforcement to support the inner member with respect to the outer member at some point or points by means of a bearing. The bearing is attached to the hollow outer member and to the inner member so as to allow only torsional rotation of the inner member and prevent nonaxial motion of the inner member with respect to the outer member at the point the bearing is used. The use of bearing supports as described above allows for a wider scope of applications, with the torsional energy device handling both torsional loads and nonaxial loads of a high magnitude. The use of bearing supports are best suited to applications requiring both torsional energy absorption characteristics and the support of exceedingly high nonaxial forces as in the suspension systems of heavy military vehicles, bulldozers, or aircraft landing gear.

Prototype devices with the inner shaft member acting as the action member were constructed and tested. The cross-sectional configurations of the prototype devices were similar to that shown in FIGS. 1 and 2. The elastomeric material used was "Multrathane F–242", a polyurethane resin manufactured by the Mobay Chemical Company and described in Mobay Technical Information Bulletin No. 87—E26. The amorphous, solid "Multrathane F—242" prepolymer was heated in a dry atmosphere at 140° F. under vacuum for about 2 hours. The material was agitated, diethylene glycol was added in the amount of 30 percent by weight of the total mass, and the mixture was again agitated and poured into the hollow outer member with the inner shaft member centrally disposed therein. Finally, the material was cured at 210° F. for about 6 hours. After the prototype was cooled, an 18-inch lever arm was rigidly connected to the inner shaft member and the hollow outer member was clamped to a I-beam. Application of a steady 400-pound load to the lever arm resulted in a deflection of 3 to 4 inches at the end of the arm. Other prototypes were used as a suspension means for a trailer. The trailer was tested at varying speed on both rough and smooth roads with various loads up to 2,000 pounds. The torsional energy absorption characteristics of the prototypes performed very satisfactorily under all of the test conditions.

The physical properties of the "Multrathane F—242" resin depend on the formulation that is used and the method of processing. The resin preferred in the practice of this invention exhibits a tensile modulus range of 650 p.s.i. to 2,400 p.s.i. at 100 percent elongation, a compression strength range of 300 p.s.i. to 1,325 p.s.i. at 10 percent deflection and a tensile strength range of 550 to 8,500 p.s.i. "Multrathane F-—242" is urethane prepolymer consisting essentially of diphenylmethane diisocyanate, and exhibits the preferred range of tensile modulus and compression strength.

It is understood, however, the elastomeric materials other than "Multrathane F—242" can perform equally well in the practice of this invention. The selection of a proper elastomeric material for this invention depends upon the physical properties desired in applying the energy absorption device to its various uses. Suitable elastomeric materials include synthetic polyisoprene, polychloroprene, poly(styrene-butadiene), polyisobutylene, polybutadiene, polysulfide, chloro-sulfonated polyethylene, polysiloxane, polyurethane diisocyanate, polyacrylate, ethylene-propylene copolymers and mixtures thereof.

As many apparently widely different embodiments of this invention may be made without departing from the spirit and scope thereof, it is to be understood that this invention is not limited to the specific embodiments thereof except as defined in the appended claims.

We claim:

1. A torsional energy absorption device comprising a hollow outer member, an inner shaft member disposed concentrically within said hollow outer member and projecting from said hollow outer member, and a continuous body of synthetic elastomeric material filling the space between the exterior of said inner member and the interior of said outer member, said elastomeric material engaging the interior of said outer member and the exterior of said inner member.

2. The device of claim 1 in which a lever arm is rigidly connected to said inner member and said outer member is rigidly connected to a frame.

3. The device of claim 1 in which a lever arm is rigidly connected to said outer member and said inner member is rigidly connected to a frame.

4. The device of claim 1 in which a lever arm is rigidly connected to said outer member and a lever arm is rigidly connected to said inner member.

5. The device of claim 4 in which said synthetic elastomeric material is a polymeric composition made from a prepolymer consisting essentially of diphenylmethane diisocyanate.

6. The device of claim 1 in which said elastomeric material has a tensile modulus of about 650 p.s.i. to 2,400 p.s.i. at 100 percent elongation, a compression strength of about 300 p.s.i. to 1,325 p.s.i. at 10 percent deflection, and a tensile strength range of about 550 to 8,500 p.s.i.

7. The device of claim 1 in which brackets are substituted for said hollow outer member.

8. The device of claim 1 in which clamps are substituted for said hollow outer member.

9. The device of claim 1 in which a bearing is individually connected to said inner and outer members thereby preventing nonaxial motion of said inner member with respect to said outer member at the points said bearings are attached.